(12) United States Patent
Chan et al.

(10) Patent No.: US 11,347,753 B2
(45) Date of Patent: May 31, 2022

(54) ASSESSING PERFORMANCE DATA (71) Applicant: KONINKLIJKE PHILIPS N.V., Eindhoven (NL)

(72) Inventors: Tak Ming Chan, Shanghai (CN); Choo Chiap Chiau, Shanghai (CN); Chun Qi Shi, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 698 days.

(21) Appl. No.: 16/196,014

(22) Filed: Nov. 20, 2018

(65) Prior Publication Data

US 2020/0159737 A1    May 21, 2020

(51) Int. Cl.
*G06F 16/00* (2019.01)
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
CPC ............. G06F 16/24578; G06F 16/248; G06F 16/285; G06F 16/26
See application file for complete search history.

(56) References Cited

U.S. PATENT DOCUMENTS

| | | | |
|---|---|---|---|
| 6,604,115 B1 | 8/2003 | Gary et al. | |
| 8,209,218 B1 | 6/2012 | Basu et al. | |
| 8,738,425 B1* | 5/2014 | Basu | G06Q 10/0637 705/7.38 |
| 9,113,353 B1* | 8/2015 | Cotanis | H04W 16/18 |
| 11,023,511 B1* | 6/2021 | Fletcher | G06F 3/04847 |
| 2011/0208565 A1 | 8/2011 | Ross et al. | |
| 2011/0295656 A1* | 12/2011 | Venkatasubramanian | G06Q 10/06393 705/7.39 |
| 2014/0146961 A1* | 5/2014 | Ristock | H04M 3/5234 379/265.12 |
| 2015/0227878 A1* | 8/2015 | Clay | G06Q 10/06393 705/7.39 |
| 2015/0317337 A1* | 11/2015 | Edgar | G16H 50/70 707/751 |

(Continued)

OTHER PUBLICATIONS http://www.sas.com/en_in/home.html.
http //www-01.ibm.com/software/analytics/spss/.

*Primary Examiner* — Noosha Arjomandi (57) ABSTRACT

The invention discloses a system configured for assessing performance data, the system comprising a memory comprising instruction data representing a set of instructions; and a processor configured to communicate with the memory and to execute the set of instructions. The set of instructions, when executed by the processor, cause the processor to: acquire a plurality of performance data records associated with a performance indicator; classify each performance data record according to the performance indicator; identify a plurality of variables in the performance data records that contribute to the classifications; determine, based on the plurality of variables, a plurality of observations relating to the performance indicator and at least one variable of the plurality of variables; and deliver the plurality of observations for presentation to a user. A method is also disclosed.

13 Claims, 6 Drawing Sheets

(56) References Cited

U.S. PATENT DOCUMENTS

| | | | |
|---|---|---|---|
| 2016/0019357 A1* | 1/2016 | Marzula | G06Q 10/10 705/2 |
| 2016/0026917 A1* | 1/2016 | Weisberg | G06N 7/005 706/46 |
| 2016/0105325 A1* | 4/2016 | Fletcher | H04L 41/0213 715/737 |
| 2016/0196587 A1* | 7/2016 | Eder | G06Q 30/0276 705/14.49 |
| 2016/0267226 A1* | 9/2016 | Xu | G06F 16/2365 |
| 2016/0379243 A1* | 12/2016 | Kalish | G06N 20/00 705/14.41 |
| 2017/0123956 A1* | 5/2017 | Lindo | G06F 11/3612 |
| 2017/0364819 A1* | 12/2017 | Yang | H04L 41/0636 |
| 2018/0089328 A1* | 3/2018 | Bath | G06F 16/901 |
| 2018/0239829 A1* | 8/2018 | Dialani | G06F 16/9535 |
| 2018/0342328 A1* | 11/2018 | Chan | G16Z 99/00 |
| 2018/0367428 A1* | 12/2018 | Di Pietro | H04L 63/1408 |
| 2019/0121916 A1* | 4/2019 | Bennun | G06F 16/972 |
| 2019/0188733 A1* | 6/2019 | Rao | G06N 20/00 |
| 2019/0286546 A1* | 9/2019 | Johnston | G06F 11/006 |
| 2019/0384255 A1* | 12/2019 | Krishnaswamy | G05B 19/4063 |
| 2020/0008725 A1* | 1/2020 | Bach | A61B 5/369 |
| 2020/0059800 A1* | 2/2020 | Menon | H04L 43/0811 |
| 2020/0098001 A1* | 3/2020 | Antala | G06Q 30/0246 |

* cited by examiner

302 — Insight details for C14 has high contribution % to issues (waiting > 6 weeks) in the 3 period
304 — - PC14 has high contribution % to issues (waiting > 6 weeks) in the 3 periods (30.43%, 1st: 16.18%, 3rd: 16.07%, 2nd
306 — - C14 has an improving trend in terms of contribution % to issues in the 3 periods (from 30.43% to 16.07%)
308 — - Click for more data

ASSESSING PERFORMANCE DATA

CROSS-REFERENCE TO RELATED APPLICATIONS

This patent application claims the benefit of International Application No. PCT/CN2017/116322, filed on Dec. 15, 2017, the contents of which are herein incorporated by reference.

FIELD OF THE INVENTION

The invention relates to assessing data and, more particularly, to assessing data relating to acts which have been performed.

BACKGROUND OF THE INVENTION

The general background of the invention is in data analysis and analytics. In many sectors, it is useful to be able to measure the performance of particular acts against one or more metrics, in order to evaluate the performance and to identify whether any modifications are required. In some scenarios, data relating to acts that have been performed may be assessed according to one or more key performance indicators (KPIs). A key performance indicator is a type of performance measurement, and enables an assessment to be made regarding the success of the performance of a particular activity, task or act.

A KPI may be set or chosen by an organization or an individual, for example, and may be indicative of a particular target or goal that it is intended to achieve. Data may be available regarding tasks which have been performed and the manner in which they were performed, including timescales, for example. By viewing such data, it may be is possible to determine whether tasks were performed to a satisfactory standard or within a desired timescale. In other words, it is possible to determine whether or not a performed task met a particular KPI.

Such KPI statistics and data may provide a user with details of areas which could be investigated further in order to determine a likely cause of a particular KPI being met or not being met. However, this data does not provide a user with a useful, easy to interpret, understanding of the causes of the ability or failure to meet a KPI.

Therefore, it is desirable to have a system which can be used to assess or analyze performance data in order to determine valuable information from such data regarding the reasons why a particular performed act met, or did not meet, a particular performance measurement (e.g. a KPI).

SUMMARY OF THE INVENTION

According to a first aspect, a system configured for assessing performance data comprises a memory comprising instruction data representing a set of instructions; and a processor configured to communicate with the memory and to execute the set of instructions, wherein the set of instructions, when executed by the processor, cause the processor to: acquire a plurality of performance data records associated with a performance indicator; classify each performance data record according to the performance indicator; identify a plurality of variables in the performance data records that contribute to the classifications; determine, based on the plurality of variables, a plurality of observations relating to the performance indicator and at least one variable of the plurality of variables; and deliver the plurality of observations for presentation to a user. The observations may be considered to be, and may be referred to as, 'findings'.

By determining, or generating, a set of observations based on the variables, the system is able to provide a user with an easy to interpret summary of the data, or insight regarding the data, which might not otherwise have been apparent from the raw data. Thus, the system may reduce the amount of user time and system time needed in analyzing the raw data. By providing a user with a convenient summary of the data, more time can be spent using the system for other purposes, and the user can spend more time performing other tasks, such as medical related tasks.

The set of instructions, when executed by the processor, may further cause the processor to rank the plurality of observations prior to delivery for presentation. Thus, more weight may be given to those observations considered to be a higher priority than others. As a consequence, those observations which relate to factors or variables which can be adjusted easily, and which may have a significant effect on improving the performance, with regards to a performance indicator, may be made clearly visible to the user.

In some embodiments, causing the processor to rank the plurality of observations may comprise causing the processor to calculate a statistical significance of each observations. The set of instructions, when executed by the processor, may cause the processor to rank the plurality of observations according to the calculated statistical significance.

The set of instructions, when executed by the processor, may further cause the processor to generate a digest summarizing at least one observation of the plurality of observations. Such a digest, or summary, allows the user to understand the meaning of the data, without needing to analyze the raw data or go through a large number of observations. In fact, the system provides the user with a conclusion based on the raw data, such that any necessary action may be taken quickly in order to improve the situation.

Causing the processor to generate a digest may, in some embodiments, comprise causing the processor to apply at least one of: a predefined template to data in the at least one observation; and a natural language processing algorithm to data in the at least one observation.

In some embodiments, causing the processor to identify the plurality of variables may comprise causing the processor to provide data from the plurality of performance data records to one or more predictive models.

In some embodiments, the set of instructions, when executed by the processor, may further cause the processor to: generate a classification criterion for the performance indicator. Causing the processor to classify each performance data record may comprise causing the processor to classify each performance data record according to the classification criterion.

In some embodiments, the classification criterion may comprise an indication as to whether or not the performance indicator is satisfied.

The set of instructions, when executed by the processor, may further cause the processor to filter the plurality of variables according to at least one metric. The at least one metric may comprise a user-defined metric.

In some embodiments, the set of instructions, when executed by the processor, may further cause the processor to: generate a graphical representation of at least one of the plurality of observations; and deliver the graphical representation for presentation to the user. A graphical representation of the observations may make it even easier for a user to interpret the raw data, and to draw rapid conclusions regarding any necessary actions that should be taken in order to improve performance in relation to the performance indicator.

According to a second aspect, a method for assessing performance data comprises acquiring a plurality of performance data records associated with a performance indicator; classifying each performance data record according to the performance indicator; identifying a plurality of variables in the performance data records that contribute to the classifications; determining, based on the plurality of variables, a plurality of observations relating to the performance indicator and at least one variable of the plurality of variables; and delivering the plurality of observations for presentation to a user.

In some embodiments, the method may comprise generating a digest summarizing at least one observation of the plurality of observations.

The method may comprise presenting, to a user, the digest and a graphical representation of the observation corresponding to the presented digest.

According to a third aspect, a computer program product comprises a non-transitory computer readable medium, the computer readable medium having computer readable code embodied therein, the computer readable code being configured such that, on execution by a suitable computer or processor, the computer or processor is caused to perform the method disclosed herein.

These and other aspects of the invention will be apparent from and elucidated with reference to the embodiments described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF EMBODIMENTS

The present disclosure provides a mechanism by which large numbers of data records may be interrogated and analyzed in order to obtain valuable information which may not immediately be evident from the raw data. Examples herein are described in the context of medical data. However, it will be appreciated that the disclosed systems and methods are applicable to a wide range of fields, and may be applied to data of any type and from many different sources.

One particular area in which the systems and methods disclosed herein may be applied is the healthcare industry. A cardiovascular information system (CVIS) may be used in some healthcare settings to store and assess patients' records. For example, a CVIS may be integrated with one or more other electronic systems, such as an electronic health record (EHR) or a laboratory information system (LIS). A user of a CVIS is able to view health records of patients whose data records are stored in the CVIS, and this data may be used for reporting, scheduling and management purposes. A user may, for example, review data for a plurality of patients, and assess the data according to one or more metrics, such as a key performance indicator (KPI).

An example of one such data element which may be assessed, particularly in the context of a CVIS, is the amount of time that a patient has had to wait for a particular procedure, such as an operation. This is known as the patient waiting time, or simply "waiting time". A particular organization, such as a healthcare organization, may have a particular target or requirement that patients are treated (e.g. a particular procedure is performed on the patient) within a defined period of time. The defined period of time may be set arbitrarily by an individual, or it may be included in guidelines, for example. One such example in the UK is that the waiting time for a patient waiting for a medical procedure should be below 6 weeks. In other words, it is intended that a patient should wait no longer than 6 weeks for a particular procedure to be performed.

Data relating to waiting times of patients may be included with other data, such as data relating to the patients, the type of procedure and/or the medical facility or institution performing the procedure, and this data may be stored on a database which forms part of the CVIS. In general, data may be stored as part of a database on a memory within, or associated with, a computing system as described below.

Figure 1:
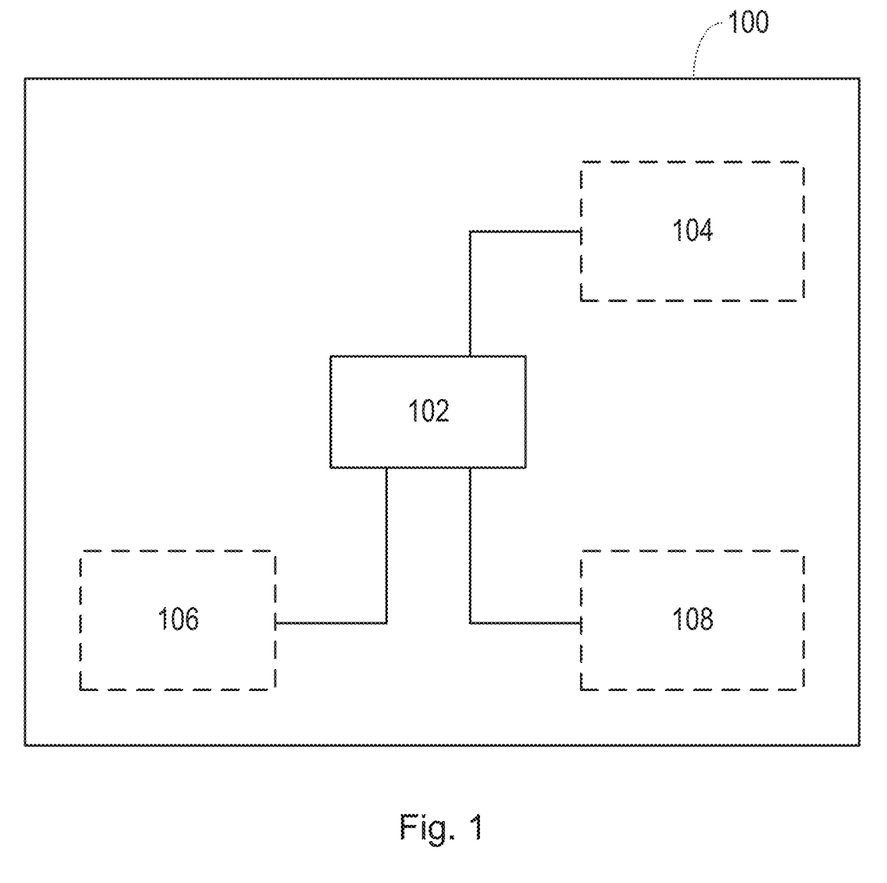
FIG. 1 is a schematic illustration of an example of a system for assessing performance data.

FIG. 1 shows a schematic block diagram of a system 100 according to an embodiment that can be used for assessing performance data. With reference to FIG. 1, the system 100 comprises a processor 102 that controls the operation of the system 100 and that can implement the methods described herein.

The system 100 further comprises a memory 106 comprising instruction data representing a set of instructions. The memory 106 may be configured to store the instruction data in the form of program code that can be executed by the processor 102 to perform the method described herein. In some implementations, the instruction data can comprise a plurality of software and/or hardware modules that are each configured to perform, or are for performing, individual or multiple steps of the method described herein. In some embodiments, the memory 106 may be part of a device that also comprises one or more other components of the system 100 (for example, the processor 102 and/or one or more other components of the system 100). In alternative embodiments, the memory 106 may be part of a separate device to the other components of the system 100.

In some embodiments, the memory 106 may comprise a plurality of sub-memories, each sub-memory being capable of storing a piece of instruction data. In some embodiments where the memory 106 comprises a plurality of sub-memories, instruction data representing the set of instructions may be stored at a single sub-memory. In other embodiments where the memory 106 comprises a plurality of sub-memories, instruction data representing the set of instructions may be stored at multiple sub-memories. For example, at least one sub-memory may store instruction data representing at least one instruction of the set of instructions, while at least one other sub-memory may store instruction data representing at least one other instruction of the set of instructions. Thus, according to some embodiments, the instruction data representing different instructions may be stored at one or more different locations in the system 100. In some embodiments, the memory 106 may be used to store information, data (e.g. images), signals and measurements acquired or made by the processor 102 of the system 100 or from any other components of the system 100.

The processor 102 of the system 100 can be configured to communicate with the memory 106 to execute the set of instructions. The set of instructions, when executed by the processor 102 may cause the processor 102 to perform the methods described herein. The processor 102 can comprise one or more processors, processing units, multi-core processors and/or modules that are configured or programmed to control the system 100 in the manner described herein. In some implementations, for example, the processor 102 may comprise a plurality of (for example, interoperated) processors, processing units, multi-core processors and/or modules configured for distributed processing. It will be appreciated by a person skilled in the art that such processors, processing units, multi-core processors and/or modules may be located in different locations and may perform different steps and/or different parts of a single step of the method described herein.

Returning again to FIG. 1, in some embodiments, the system 100 may comprise at least one user interface 104. In some embodiments, the user interface 104 may be part of a device that also comprises one or more other components of the system 100 (for example, the processor 102, the memory 106 and/or one or more other components of the system 100). In alternative embodiments, the user interface 104 may be part of a separate device to the other components of the system 100.

A user interface 104 may be for use in providing a user of the system 100 (for example, a researcher such as a medical researcher, a medical professional, or any other user of a neural network model) with information resulting from the method according to embodiments herein. The set of instructions, when executed by the processor 102 may cause processor 102 to control one or more user interfaces 104 to provide information resulting from the method according to embodiments herein. Alternatively or in addition, a user interface 104 may be configured to receive a user input. In other words, a user interface 104 may allow a user of the system 100 to manually enter instructions, data, or information. The set of instructions, when executed by the processor 102 may cause processor 102 to acquire the user input from one or more user interfaces 104.

A user interface 104 may be any user interface that enables rendering (or output or display) of information, data or signals to a user of the system 100. Alternatively or in addition, a user interface 104 may be any user interface that enables a user of the system 100 to provide a user input, interact with and/or control the system 100. For example, the user interface 104 may comprise one or more switches, one or more buttons, a keypad, a keyboard, a mouse, a mouse wheel, a touch screen or an application (for example, on a tablet or smartphone), a display screen, a graphical user interface (GUI) or other visual rendering component, one or more speakers, one or more microphones or any other audio component, one or more lights, a component for providing tactile feedback (e.g. a vibration function), or any other user interface, or combination of user interfaces.

In some embodiments, as illustrated in FIG. 1, the system 100 may also comprise a communications interface (or circuitry) 108 for enabling the system 100 to communicate with interfaces, memories and/or devices that are part of the system 100. The communications interface 108 may communicate with any interfaces, memories and devices wirelessly or via a wired connection.

It will be appreciated that FIG. 1 only shows the components required to illustrate this aspect of the disclosure and, in a practical implementation, the system 100 may comprise additional components to those shown. For example, the system 100 may comprise a battery or other power supply for powering the system 100 or means for connecting the system 100 to a mains power supply.

In more detail, as noted above, the system 100 is configured for assessing performance data. The memory 106 comprises instruction data representing a set of instructions. The processor 102 is configured to communicate with the memory and to execute the set of instructions. Briefly, the set of instructions, when executed by the processor 102 of the system 100, cause the processor 102 to acquire a plurality of performance data records associated with a performance indicator; classify each performance data record according to the performance indicator; identify a plurality of variables in the performance data records that contribute to the classifications; determine, based on the plurality of variables, a plurality of observations relating to the performance indicator and at least one variable of the plurality of variables; and deliver the plurality of observations for presentation to a user. The observations may be considered to be, and may be referred to as, "findings". For example, the observations (or findings) may be considered to be outcomes based on analysis of the performance data.

Figure 2:
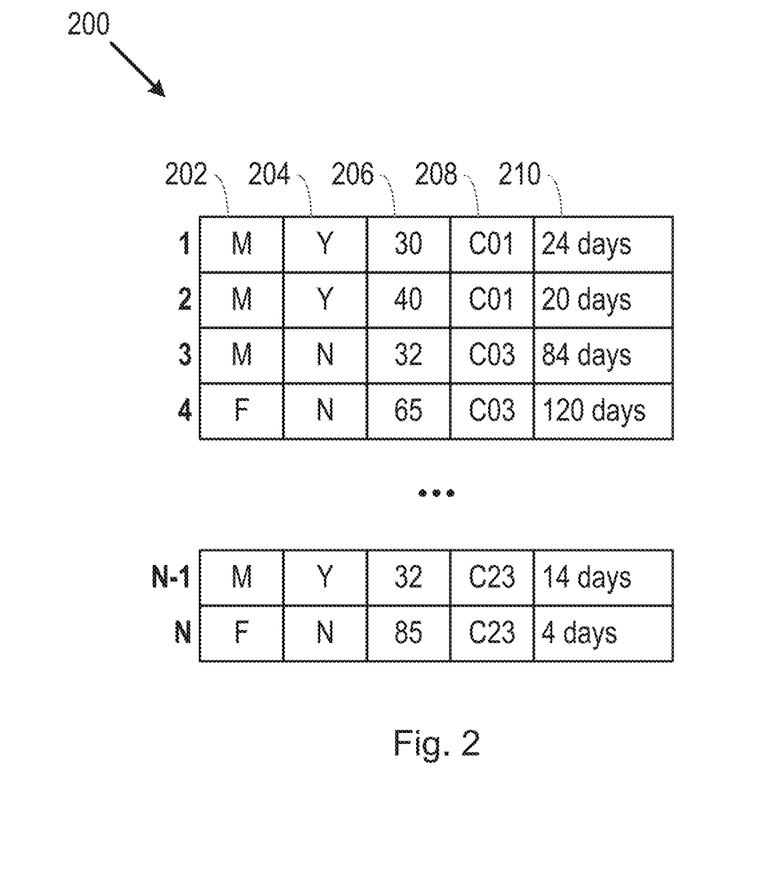
FIG. 2 is a table including performance data for a plurality of records.

The performance data records may relate to the performance of any type of activity or task performed previously. In this way, the performance data records may be considered to comprise historical, or past data. Each performance data record may, for example, relate to a single activity or task and/or to a particular entity. For example, in a healthcare environment, each performance data record may relate to the performance of an activity or task in relation to a particular patient. FIG. 2 shows an example of a plurality of performance data records arranged in a table 200. In this example, each row in the table 200 relates to a procedure for a particular patient, numbered 1 to N. Each column in the table 200 includes data associated with a particular variable relating to the procedure performed and/or to the patient in relation to whom the procedure was performed. Column 202 indicates the gender of the patient ('M' for male, 'F' for female); column 204 indicates whether the patient suffers from a particular medical condition which, in this case, is diabetes ('Y' if the patient does suffer from the medical condition, 'N' if not); column 206 indicates the age of the patient; column 208 indicates an identification code or number of a consultant responsible for, or who performed, the procedure in relation to the patient; column 210 indicates the waiting time for the patient (i.e. the duration from the date on which the patient waited from being placed on a waiting list to have the procedure to the date on which the procedure was performed). In other examples, the waiting time may be defined differently.

It will be appreciated that it is likely that more data records will be included than are shown in the table 200. In some examples, a database may include hundreds or thousands of performance data records. For example, a database may include records relating to all medical procedures performed in relation to patients of an entire hospital, or health organization. Furthermore, it will be appreciated that each data record may include more or less data (i.e. the table 200 may include more or fewer columns) depending on the amount of data available. For example, a database may include an indication of the type of procedure performed, an indication of the priority of the procedure (e.g. whether the procedure was performed electively or the patient was on standby for the procedure), an indication of whether or not the patient was treated privately (e.g. as part of a paid treatment), an indication of the medical facility at which the patient was treated, and so on.

Each performance data record is associated with one or more performance indicators. In the example shown in FIG. 2, the performance data records are associated with the performance indicator relating to waiting time. Specifically, the performance indicator relates to the aim, or desire, to ensure that patients do not wait longer than a defined time (e.g. six weeks) on a waiting list for a procedure. If, a procedure is performed within the defined period, then that particular case can be said to have met or satisfied the performance indicator. However, if a procedure is not performed within the defined period, then that particular case is not considered to have met or satisfied the performance indicator. As noted above, performance indicators may be referred to as key performance indicators (KPIs), and these may be used, for example, to assess how well a particular entity, company or organization is doing at satisfying a set of guidelines.

In some examples, a performance data record may be associated with multiple performance indicators, such that the data record may be used to assess performance against multiple performance indicators. For example, a data record may be associated with a first performance indicator relating to waiting times (as in the above example), and a second performance indicator relating to how successful the procedure was at treating a particular medical condition. In this example, the data record may be used to assess the waiting times and/or the success of the procedure.

Once the performance data records have been acquired, the instructions cause the processor 102 of the system 100 to classify each performance data record according to the performance indicator. Classification of each performance data record may be based on a binary classification mechanism, whereby a data record is classified as having satisfied the performance indicator if a particular criterion (or set of criteria) is met, and classified as not having satisfied the performance indicator if the particular criterion (or set of criteria) is not met. In the example discussed above with reference to FIG. 2, each data record (1 to N) may be classified according to whether or not it meets the requirement regarding waiting times. For example, if the maximum intended waiting time is six weeks (i.e. 42 days) then, in the data shown in FIG. 2, the data records 1, 2, N−1 and N may be considered to have met the waiting time criterion as their waiting times are all less than 42 days, while the data records 3 and 4 may be considered to have not met the waiting time criterion as their waiting times are all longer than 42 days.

In some embodiments, the performance indicator associated with each performance data record may be transformed into a categorical class or rule. Thus, in such embodiments, the set of instructions stored in the memory 106, when executed by the processor 102, may further cause the processor to generate a classification criterion for the performance indicator. As above, the classification criterion may be a binary classification, for example classifying according to whether or not the criterion is met. For example, the classification criterion may comprise an indication as to whether or not the performance indicator is satisfied. In some embodiments, the performance indicator may be transformed into a classification criterion such that a data record can be classified according to whether or not there is an issue (i.e. a problem or concern) with regard to the classification criterion. For example, if a data record meets the classification criterion (e.g. the waiting time is less than the defined duration) then it may be classified with an 'N', to indicate that there is no issue regarding that particular criterion; however, if the data record does not meet the classification criterion (e.g. the waiting time is longer than the defined duration) then it may be classified with a 'Y', to indicate that there is an issue regarding that particular criterion.

The classification of data records may be done manually, for example by a medical professional assigning a classification to each record, or by the responsible consultant after the procedure, or may be done automatically, for example using a rule-based automated process. In some embodiments, classification rules may automatically be inferred according to the data. For example, techniques such as information gain cut-off and/or clustering may be used to determine whether or not each data record meets the classification criterion. In one example, past performance data records are sorted into a particular order (e.g. in order of ascending waiting time), and a mean shift clustering method is applied to find a turning point in the data. Those records above the turning point will be classified as not meeting the classification criterion for the performance indicator, and those records below the turning point will be classified as meeting the classification criterion. In some embodiments, classification criteria, such as maximum waiting time, may be determined based on a requirement set out in a set of guidelines. In some embodiments, machine learning techniques may be used to determine classification criterion or rules automatically.

In embodiments in which a classification criterion is determined for the performance indicator, causing the processor to classify each performance data record may comprise causing the processor to classify each performance data record according to the classification criterion.

In some embodiments, a user may be provided with the option to update, or change the performance indicator, or to define the classification criterion differently. For example, in a case where the classification criterion requires that a procedure is performed within six weeks, a user may update the criterion to require that a procedure is performed within a different period, such as four weeks.

The instructions stored in the memory 106, when executed by the processor 102, further cause the processor to identify a plurality of variables in the performance data records that contribute to the classifications. Within the performance data records, there may be multiple variables that contribute to the classification (e.g. whether or not the performance indicator has been satisfied). In the example discussed with reference to FIG. 2, whether or not a particular procedure is performed within the required waiting time may depend on any variables included in the data records. For example, the failure to meet the target waiting time for a particular case may be associated with the gender of the patient, with whether or not the patient suffers from a particular medical condition, with the patient's age, with the consultant responsible for the procedure, or with any other factor or variable which may be included in the data record. Some variables, such as the gender of the patient, are unlikely to have a strong contributory effect on whether or not the procedure is completed within the target waiting time. However, other variables, such as the consultant responsible for the procedure, may have a relatively strong effect. As noted above, hundreds or thousands (or even more) of data records may be acquired and assessed, and each data record may include tens or hundreds of data fields, each of which may constitute a variable, or contributing factor, regarding whether or not a classification criterion is met. Furthermore, some contributing factors may contribute more strongly if other contributing factors are present. For example, a particular consultant may contribute to a longer waiting time, but only when performing a particular type of procedure, or only when performing procedures in a particular medical facility. Thus, it is not possible to interpret all of the data manually and establish which variables contribute most strongly to a particular classification.

In some embodiments, causing the processor 102 to identify the plurality of variables may comprise causing the processor to provide data from the plurality of performance data records to one or more predictive models. Various predictive models may be used in order to identify the contributing variables in the performance data records. In some embodiments, machine learning models, such as neural networks and/or deep learning networks may be used. Identifying the plurality of variables may, in some embodiments, comprise using one or more pattern discovery models, decision trees, rule generation models, and/or maximum information gain models. The performance data records, after they have been classified, may be fed into the one or more predictive models so as to train the models. In this way, the models can learn which variables or combination of variables contribute most strongly towards the particular classifications. For example, the models may learn which factors contribute most strongly towards a waiting time target being met (or not being met).

Various data processing and data analysis techniques may be used to analyze the data output from the various predictive models in order to determine which predictive model this identifies the most strongly contributing variables. Predictive performance metrics including 'Area Under a receiver operating characteristics Curve' (AUC) may be used to assess the predictive models. The AUC metric indicates the trade-off between covering more real targets and introducing more false candidates. Cross validation techniques may be used to compare the metrics of the various predictive models. In particular, in a cross-validation, part of the data is held out and the rest of the data is used to construct a predictive model. The constructed model is then used against the held-out data to make predictions. The predictions are compared with the actual values of the performance indicators to calculate the predictive performance metrics.

From the analysis of predictive models and the outputs of the predictive models, a determination may be made as to which predictive model provides the best predictive performance metrics (in terms of the variables that contribute to the classifications). The predictive model that is determined to provide the best performance may then be selected, and the variables determined by that predictive model may be used to determine one or more observations relating to the data as discussed below.

The plurality of variables identified by the best predictive model may include some variables which contribute strongly towards the classification made, and some variables which do not contribute strongly towards the classification made. Thus, in some embodiments, further analysis of the variables may be performed in order to shortlist the variables, and identify which ones are most relevant. In some examples, each variable in the plurality of variables may be compared with (e.g. iterated over) each other variable in the plurality of variables.

The plurality of variables may be reduced in number through analysis or filtering according to one or more metrics. Since comparing each variable with each other variable may be a large and data intensive task, the system may, in some embodiments, reduce the comparison task by limiting the number of variables compared. A determination may be made as to which variables are likely to provide the most useful information when compared with other variables. Such a determination may be made, for example, by analyzing previous user behavior, past analysis records (i.e. outcomes of similar data analysis techniques performed previously) and/or literature (e.g. guidelines) relating to the performance indicator. For example when analyzing waiting time, a predictive model may indicate that the consultant responsible for the procedure is strongly contributing factor in whether or not a performance indicator is met. From an analysis of past KPI data relating to waiting times, the system may infer that time periods of quarters and months are particularly relevant when considering waiting times of consultants. The system may also infer that the type of procedure to be performed is a significant contributing factor to the waiting time. This may, for example, be inferred as it is frequently investigated in analysis of other KPIs. As a result, the system may, in this example, analyze data for each consultant in terms of their waiting time distributions broken down into quarters and months, and in terms of the type of procedure performed.

In one embodiment, all textual elements of the variables and/or the guidelines associated with the performance indicator may be recorded according to past performance data record analysis history, and the most related variables may be identified as variables for further analysis with respect to other variables. In other embodiments, all of the unique values of the variables may be transformed into items $\{I1, I2, I3, \ldots IN\}$, where performance indicator-related terms such as the classification criteria are a subset of the items $\{I'1, I'2, I'3, \ldots I'k\}$, where $k<N$. Frequent itemset mining may be used to identify items that frequently appear with a performance indicator-related items. In other embodiments, a "word2vec" method may be used to identify word vectors that represent the distributional semantics of user behaviors recorded as performance indicator-related items with context items, and word vectors of other performance indicator analytics. Activities and/or behaviors that show close similarities with the performance indicator word vector may be identified as variables for further analysis.

By analyzing past performance data records, trends in the performance over time may be identified, such that a user may be able to tell quickly whether performance of activities and tasks is generally improving or deteriorating. Such knowledge may allow decisions to be made regarding particular variables identified in the performance data records, for example to enable poor performance to be improved.

In the example above, the determination of variables to be compared with one another, and analyzed, is made automatically by a decision made by the system. However, in some embodiments, a user may select variables to be compared with one another and analyzed. For example, in some embodiments, a user may consider that the age of the patient may contribute strongly to the waiting times for performing procedures and, therefore, the user may choose patient age as a filtering mechanism before other variables are shortlisted and analyzed.

The analysis performed on the plurality of variables is intended to reduce the size of the dataset to be analyzed so that the analysis may be performed quicker, and so that less processing resources are required. Data analysis of this kind may be referred to as "slicing and dicing", whereby a large dataset is "sliced" and "diced" in order to assess particular variables with respect to particular other variables, but without taking into account all of the variables in the dataset.

In some embodiments, certain variables may appear to contribute strongly to a particular classification (e.g. a particular variable may appear to result in longer waiting times), but there may be a reason why these variables are strongly contributing, and these may not be avoidable. For example, a particular procedure may require a period of one month of patient observations prior to the procedure being performed. In such cases, a procedure may be requested, causing a particular patient to be added to a waiting list, but since the patient must be observed for one month, the waiting time for the procedure may necessarily be extended by one month. In such cases, where a contributing factor is unavoidable and known, the contributing factor for variable may be ignored or removed from the analysis.

In some embodiments, multiple performance indicators may be of interest, or may be relevant. In such examples, the system may provide multi-resolution analysis, in which variables associated with one performance indicator may be analyzed with regard to variables associated with another performance indicator.

Thus, in general, the instructions stored in the memory, when executed by the processor, may cause the processor to filter the plurality of variables according to at least one metric. In some embodiments, the at least one metric may comprise a user-defined metric. As noted above, filtering the plurality of variables will reduce the size of the dataset to be analyzed, thereby reducing the time and processing power required to analyze the data and determine the observations. The metric or metrics according to which the plurality of variables may be filtered may be selected automatically by the system, or manually by a user. As explained above, the metrics may be based on other variables such as, for example, whether or not the procedure was an elective procedure, the age of the patient in respect of whom the procedure was performed, the hospital or facility which the procedure was performed, and so on. Filtering the variables may enable a user to remove data from the dataset which is irrelevant, not useful in the assessment, and/or considered trivial (e.g. not an important factor in the classification).

Filtering may be used to reduce the size of the dataset to be analyzed to include data relating to variable considered to contribute most strongly towards the classifications. In some embodiments, filtering the variables may comprise applying a baseline or threshold; those variables falling below the baseline or threshold may be disregarded or omitted from the analysis, while those variables above the baseline for threshold may be included in the analysis and considered further. The baseline or threshold may, in some examples, be set by the user, and may include, for example, a p-value of statistical significance, or a threshold number of variables to consider.

Once analysis has been performed on the plurality of variables, the variables may be ranked, for example in order of contribution made towards the classification. For example, those variables determined to be most strongly contributing to the classification may be ranked higher than those variables which are determined to have little contributory effect to the classification. The highest ranked variables (e.g. the top 10 most contributing variables) may be used as a subset of variables from which to determine observations. In some embodiments, a subset of variables may be determined in some other way, for example using a baseline or threshold as discussed above.

The instructions stored in the memory, when executed by the processor, cause the processor to determine, based on the plurality of variables, a plurality of observations relating to the performance indicator and at least one variable of the plurality of variables, as noted above. In some examples, the observations may be determined based on the subset of variables established using the methods described above. The observations discussed herein may be considered to be insights as they are considered to provide a user with an insight to the data being analyzed which was not immediately apparent to the user from the raw data.

An observation may be considered to be a summary of the analyzed data, which enables the user to deduce the most important and relevant facts regarding the data concerned. For example, in the scenario discussed above, where the waiting times for various consultants are analyzed, with waiting times broken down into weeks and quarters, an observation be determined relating to a particular consultant, C03. According to one example, the system may determine an observation that "C03: average 6.1, 6.4, 7.2 weeks on Q2, Q3, Q4". In other words, based on the analyzed data, it is determined that, for the particular consultant having the identifier C03, waiting times during the quarter Q2 were, on average, 6.1 weeks, waiting times during the quarter Q3 were, on average, 6.4 weeks and waiting times during the quarter Q4 were, on average, 7.2 weeks. In another example, where waiting times for various consultants are assessed with respect to whether or not a procedure is an elective procedure (i.e. patient chooses to have the procedure, rather than the procedure being instructed by a medical professional), system may determine an observation that "C15 average 6.2 weeks on elective priority, others ranging from 3.2 to 5.8". In other words, it is determined that, for the particular consultant having the identifier C15, the waiting time for elective procedures is, on average, 6.2 weeks while, for other (non-elective) procedures, the waiting time is, on average, between 3.2 weeks and 5.8 weeks. While just two example observations are given here, it will be appreciated that the system may determine many observations based on numerous variables, and broken down in many different ways.

In some embodiments, the instructions in the memory, when executed by the processor, may cause the processor to rank the plurality of observations prior to delivery for presentation. The observations may be ranked, or a subset of observations may be identified or selected, by considering the statistical significance of the observations. Thus, causing the processor to rank the plurality of observations may comprise causing the processor to calculate a statistical significance of each observation. In some embodiments, the set of instructions, when executed by the processor, may cause the processor to rank the plurality of observations according to the calculated statistical significance. For example, an observation considered to have a relatively higher statistical significance may be ranked higher than an observation whose statistical significance is relatively lower. In some examples, the statistical significance of an observation may be measured using p-values (i.e. probability values), whereby a lower p-value is indicative of a greater statistical significance. In some embodiments, the statistical significance (e.g. the p-value) may be presented to the user along with the observation.

The process of ranking the plurality of observations may, in some embodiments, comprise scoring the embodiments, according to a defined scoring system. Those observations having the highest score may be considered to be the most relevant observations and may, therefore, be ranked higher in the list of the plurality of observations. These higher ranked observations may be considered to be the "top observations" or "top insights". In some embodiments, those observations ranked below a baseline or threshold level, or those observations which score less than the threshold amount, may be omitted or ignored in any further analysis.

In this way, the system can be said to prioritize observations, and present those observations with a higher priority to the user in a more prominent position (i.e. higher in the ranked list). The higher-priority observations are given more weight as these observations may be used by the user to make relatively minor changes in order to improve the overall performance of activities or tasks related to the performance indicator. For example, if it is apparent from a high priority observation that a particular consultant's waiting times are becoming progressively longer in recent months, then it may be indicative that the consultant's workload is too great. This may not be immediately apparent from the raw data, particularly in view of all the other variables that could have an effect on the waiting times. By providing a user with this analysis, the user may be able to take any necessary actions to improve the waiting time performance, for example by reducing the consultant's workload. This not only makes it easier for the user to identify any performance-related problems, but also enables other potential issues to be dealt with at an early stage (e.g. the consultant's workload can be reduced before it becomes too large). Moreover, by reducing the number of variables (e.g. by filtering, prioritizing and ranking), the amount of data to be analyzed by the processor is reduced, thereby reducing the processing burden and the computation time.

In other embodiments, the observations may be ranked using other techniques. For example, the system may analyze the errors in the classification of data records for each of the variables relating to the performance indicator. Those observations which are based on variables with the lowest number of missed classifications may be shortlisted as preferred (higher-ranked) observations.

In other embodiments, a subset of performance data records that have been classified as not meeting a particular criterion associated with the performance indicator (e.g. those performance data records that have been classified as having an "issue") may be analyzed, and a precision and sensitivity may be calculated. An f-score (i.e. the harmonic mean of precision and sensitivity) or a g-mean (i.e. the geometric mean of the sensitivity and specificity) may be calculated for each performance data record in the subset, and the records with the highest f-score (or g-mean) (e.g. those data records having an f-score or g-mean above a defined threshold) may be shortlisted. Those observations associated with the shortlisted records may be shortlisted as preferred observations.

While the observations generated by the system provide a convenient summary of relevant portions of the data for the user, the data may still be in numerical form, or in some format which is difficult to interpret. Thus, according to some embodiments, the system may convert the observations into an alternative format which may be easier to consume for a user. In some embodiments, the instructions in the memory, when executed by the processor, may cause the processor to generate a digest summarizing at least one observation of the plurality of observations. As used herein, the term "digest" is intended to mean a summary or compilation of information or data. For example, the digest may include a sentence, phrase or expression explaining the observation. For the example observations above, an example digest might be generated which reads "C03 has worsening and higher waiting time over the recent three quarters". Another example digest might read "C15 has significantly longer waiting times on elective procedures". Thus, rather than simply generating an observation which requires the user to interpret the data, the system is able to provide a user with a simple and easy to understand summary.

Causing the processor to generate a digest may, in some embodiments, comprise causing the processor to apply at least one of a predefined template to data in the at least one observation; and a natural language processing algorithm to data in the at least one observation. Thus, in some examples, information included in an observation may be incorporated into one or more predefined digest template. For example, memory may store a plurality of templates, and the system may select one or more relevant templates to be used in generating the digest. In other examples, natural language processing may be used to analyze the information included in the observation and to generate suitable wording which can be used as a digest.

Causing the processor to deliver the plurality of observations for presentation to a user may comprise displaying the plurality of observations on a display associated with the system. For example, the plurality of observations may be displayed to the user using the user interface 104 of the system 100. In some embodiments, the digest or digests generated by the system may also or alternatively be displayed on a display.

Figure 3:
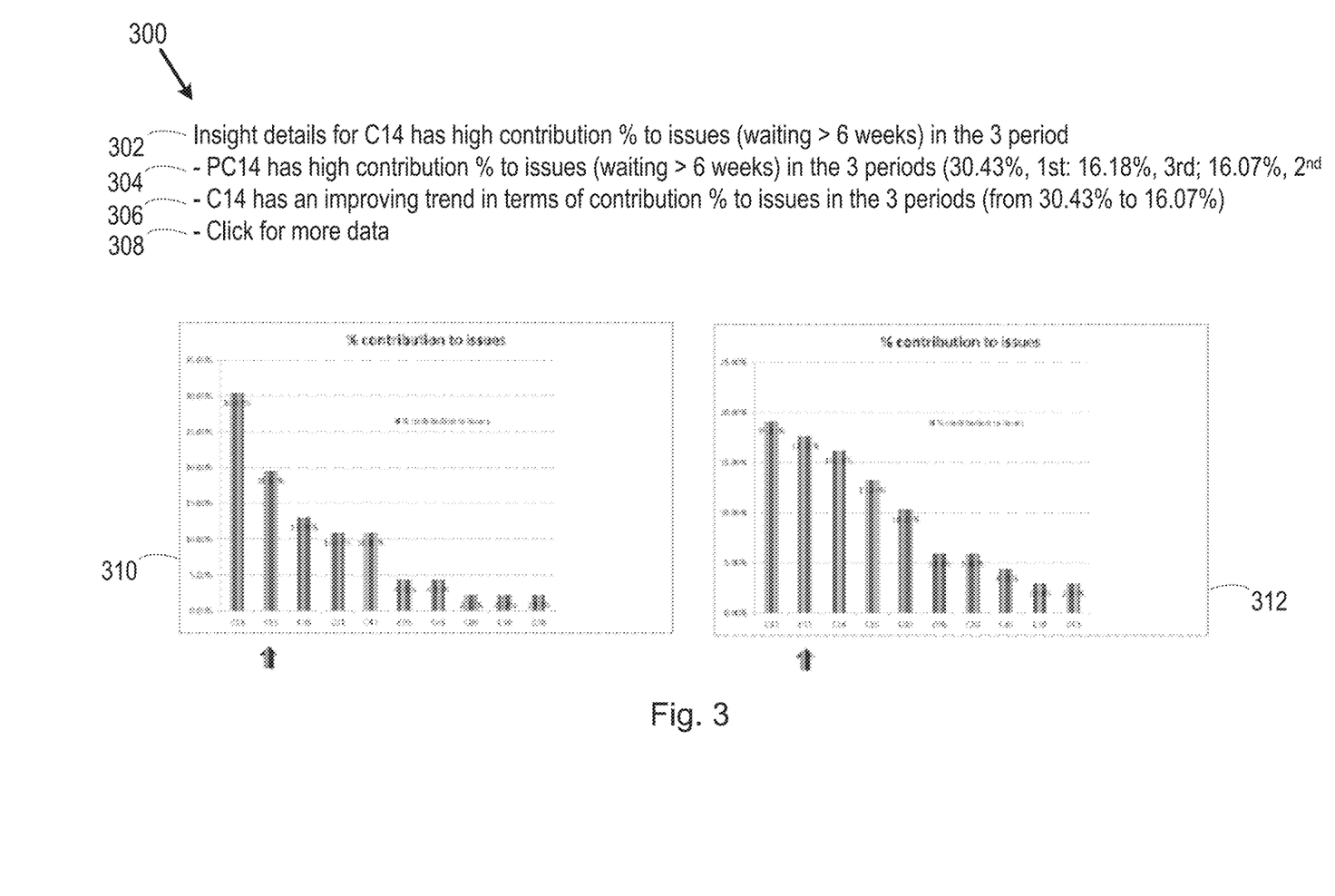
FIG. 3 is an illustration of an example of graphical representations and observations.

In some embodiments, the instructions, when executed by the processor, may further cause the processor to generate a graphical representation of at least one of the plurality of observations. The instructions may further cause the processor to deliver the graphical representation for presentation. For example, the representation may be displayed on display along with, or instead of, the observations and/or the digests. Any graphical representation may be generated, such as a graph, a chart, a drawing, a diagram, an image or the like. FIG. 3 is example of a display 300 which may be presented to a user using the system 100 disclosed herein. The display 300 includes a title 302, explaining what the information in the display relates to. Under the title 302, the display 300 includes two digests 304, 306 relating to observations determined from performance data records, and a link 308 via which further information can be obtained. The display 300 also includes two graphical representations 310, 312 relating to one or more of the digests 304, 306. In this example, the graphical representations 310, 312 are graphs showing data relating to the percentage of performance data records which contribute to issues (meets a particular classification criterion).

According to some embodiments, a user may be able to interact with a presented item (e.g. an observation, digest and/or graphical representation), for example by selecting or clicking on an item, or hovering a cursor above the presented item. Such a selection may cause additional information to be provided to the user. For example, reasoning behind the observation may be provided to the user. In some embodiments, the analysis mechanism and/or the various steps of filtering and shortlisting may be presented to the user. In this way, the user may be able to access or of the necessary data used to generate the observation presented to them. This may enable a user to have a deeper understanding of why the observation was generated.

Figure 4:
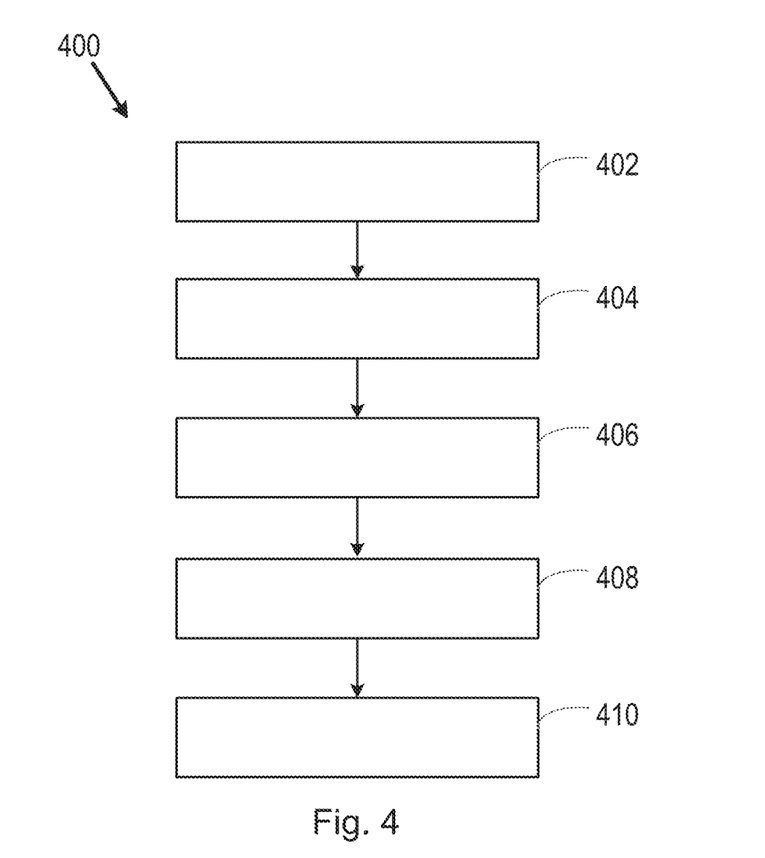
FIG. 4 is a flowchart of an example of a method of assessing performance data.

According to another aspect, a method for assessing performance data is disclosed. FIG. 4 is a flowchart of an example of a method 400 for assessing performance data. The method 400 comprises, at step 402, acquiring a plurality of performance data records associated with a performance indicator. At step 404, the method 400 comprises classifying each performance data record according to the performance indicator. The method 400 comprises, at step 406, identifying a plurality of variables in the performance data records that contribute to the classifications. At step 408, the method 400 comprises determining, based on the plurality of variables, a plurality of observations relating to the performance indicator and at least one variable of the plurality of variables. At step 410, the method 400 comprises delivering the plurality of observations for presentation to a user. In some examples, the step of acquiring (step 402) may comprise acquiring a plurality of performance data records with a least one variable associated with a performance indicator.

It will be appreciated that the method 400 may be performed by the processor 102 of the system 100 described above. Thus, the method 400 may be considered a computer-implemented method.

Figure 5:
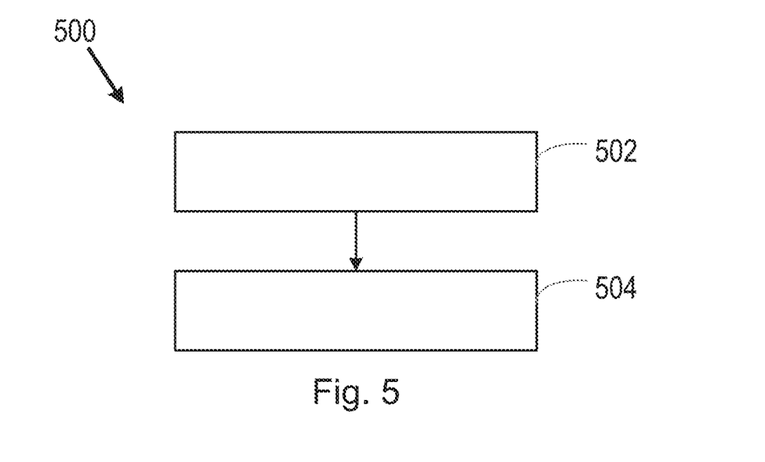
FIG. 5 is a flowchart of a further example of a method of assessing performance data.

FIG. 5 is a flowchart of a further example of a method 500 for assessing performance data. The method 500 may comprise one or more steps of the method 400 discussed above. The method 500 may further comprise, at step 502, generating a digest summarizing at least one observation of the plurality of observations. At step 504, the method 500 may further comprise presenting, to a user, the digest and a graphical representation of the observation corresponding to the presented digest. As noted above, the graphical representation of the observation may be in the form of a graph or chart, for example.

Figure 6:
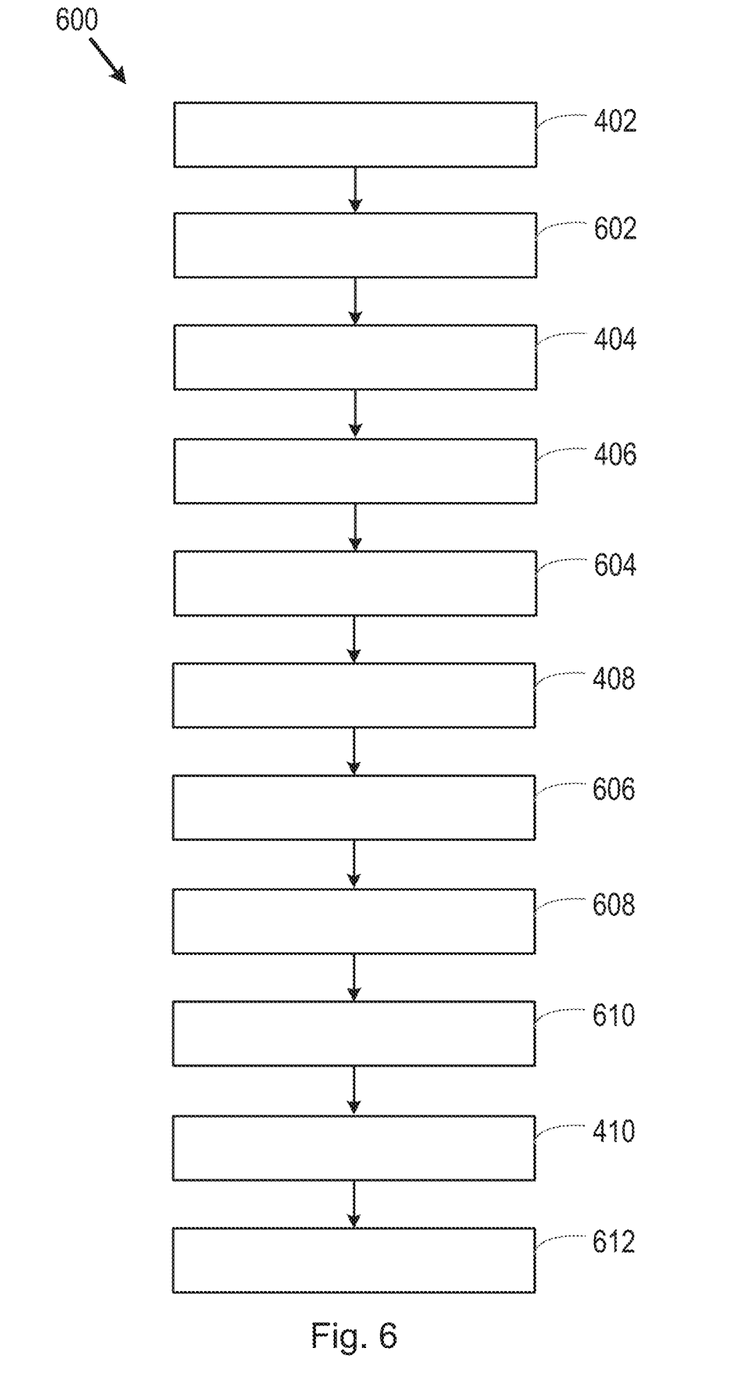
FIG. 6 is a flowchart of a further example of a method of assessing performance data.

FIG. 6 is a flowchart of a further example of a method 600 for assessing performance data. The method 600 describes an example of a specific embodiment including steps which may be performed, for example by the processor 102, and which correspond to instructions discussed above with reference to FIG. 1. The method 600 includes the steps 402 to 410 of the method 400 discussed above. Following the step of acquiring a plurality of performance data records (step 402), the method 600 may comprise, at step 602, generating a classification criterion for the performance indicator. The method 600 then proceeds to step 404, in which each performance data record is classified according to the performance indicator. In some embodiments, each performance data record may classified according to the classification criterion generated in step 602.

According to the method 600, a plurality of variables in the performance data records that contribute to the classifications are then identified (step 406). The method 600 then proceeds with step 604, in which the plurality of variables are filtered according to at least one metric. The at least one metric may comprise a user-defined metric. Following the filtering (step 604), the method 600 continues with step 408, in which a plurality of observations relating to the performance indicator and at least one variable of the plurality of variables are determined. At step 606, the method 600 ranks the plurality of observations. At step 608, the method 600 generates a digest summarizing at least one observation of the plurality of observations. The method 600 then continues with step 610, in which a graphical representation of at least one of the plurality of observations is generated. The method 600 then proceeds to step 410, in which the plurality of observations are delivered for presentation to a user. At step 612, the method 600 further comprises delivering the graphical representation for presentation to the user.

Figure 7:
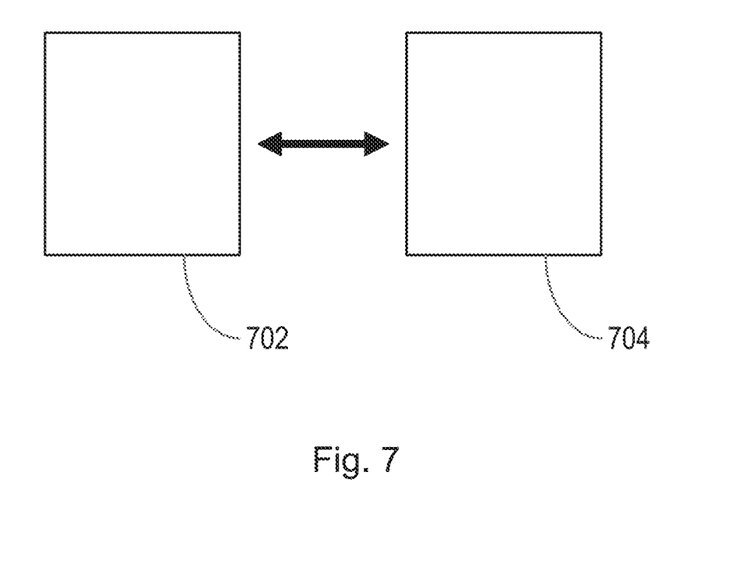
FIG. 7 is a schematic illustration of a machine readable medium and a processor.

According to a further aspect, a computer program product is disclosed. The computer program product comprises a non-transitory computer readable medium 702, the computer readable medium having computer readable code embodied therein, the computer readable code being configured such that, on execution by a suitable computer or processor 704, the computer or processor is caused to perform any of the methods disclosed herein.

The processor 102, 704 can comprise one or more processors, processing units, multi-core processors or modules that are configured or programmed to control the system 100 in the manner described herein. In particular implementations, the processor 102, 704 can comprise a plurality of software and/or hardware modules that are each configured to perform, or are for performing, individual or multiple steps of the method described herein.

The term "module", as used herein is intended to include a hardware component, such as a processor or a component of a processor configured to perform a particular function, or a software component, such as a set of instruction data that has a particular function when executed by a processor.

It will be appreciated that the embodiments of the invention also apply to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to embodiments of the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system configured for assessing performance data, the system comprising:
   a memory comprising instruction data representing a set of instructions; and
   a processor configured to communicate with the memory and to execute the set of instructions, wherein the set of instructions, when executed by the processor, cause the processor to:
   acquire a plurality of performance data records associated with a performance indicator;
   classify each performance data record according to the performance indicator;
   identify a plurality of variables in the performance data records that contribute to the classifications;
   determine, based on the plurality of variables, a plurality of observations relating to the performance indicator and at least one variable of the plurality of variables;
   rank the plurality of observations prior to delivery for presentation by calculating a statistical significance comprising probability values of each observation and ranking the plurality of observations according to the calculated statistical significance; and
   deliver the plurality of observations and probability values of each observation for presentation to a user.

2. The system according to claim 1, wherein the set of instructions, when executed by the processor, further cause the processor to:
   generate a digest summarizing at least one observation of the plurality of observations, the digest comprising a sentence or phrase explaining the observation.

3. The system according claim 2, wherein causing the processor to generate a digest comprises causing the processor to apply at least one of:
   a predefined template to data in the at least one observation; and a natural language processing algorithm to data in the at least one observation.

4. The system according to claim 1, wherein causing the processor to identify the plurality of variables comprises causing the processor to provide data from the plurality of performance data records to one or more predictive models.

5. The system according to claim 1, wherein the set of instructions, when executed by the processor, further cause the processor to:
   generate a classification criterion for the performance indicator;
   wherein causing the processor to classify each performance data record comprises causing the processor to classify each performance data record according to the classification criterion.

6. The system according to claim 5, wherein the classification criterion comprises an indication as to whether or not the performance indicator is satisfied.

7. The system according to claim 1, wherein the set of instructions, when executed by the processor, further cause the processor to:
   filter the plurality of variables according to at least one metric.

8. The system according to claim 7, wherein the at least one metric comprises a user-defined metric.

9. The system according to claim 1, wherein the set of instructions, when executed by the processor, further cause the processor to:
   generate a graphical representation of at least one of the plurality of observations; and
   deliver the graphical representation for presentation to the user.

10. A method for assessing performance data, the method comprising:
    acquiring a plurality of performance data records associated with a performance indicator;
    classifying each performance data record according to the performance indicator;
    identifying a plurality of variables in the performance data records that contribute to the classifications;
    determining, based on the plurality of variables, a plurality of observations relating to the performance indicator and at least one variable of the plurality of variables;
    ranking the plurality of observations prior to delivery for presentation by calculating a statistical significance comprising probability values of each observation and ranking the plurality of observations according to the calculated statistical significance; and
    delivering the plurality of observations and probability values of each observation for presentation to a user.

11. The method according to claim 10, further comprising:
    generating a digest summarizing at least one observation of the plurality of observations.

12. The method according to claim 11, further comprising:
    presenting, to a user, the digest and a graphical representation of the observation corresponding to the presented digest.

13. A computer program product comprising a non-transitory computer readable medium, the computer readable medium having computer readable code embodied therein, the computer readable code being configured such that, on execution by a suitable computer or processor, the computer or processor is caused to perform a method comprising:
    acquiring a plurality of performance data records associated with a performance indicator;
    classifying each performance data record according to the performance indicator;
    identifying a plurality of variables in the performance data records that contribute to the classifications;
    determining, based on the plurality of variables, a plurality of observations relating to the performance indicator and at least one variable of the plurality of variables;
    ranking the plurality of observations prior to delivery for presentation by calculating a statistical significance comprising probability values of each observation and ranking the plurality of observations according to the calculated statistical significance;
    delivering the plurality of observations for presentation to a user; and generating a digest summarizing at least one observation of the plurality of observations, the digest comprising a sentence or phrase explaining the observation.

\* \* \* \* \*